(12) United States Patent
Gorban

(10) Patent No.: US 10,331,975 B2
(45) Date of Patent: Jun. 25, 2019

(54) TRAINING AND/OR USING NEURAL NETWORK MODELS TO GENERATE INTERMEDIARY OUTPUT OF A SPECTRAL IMAGE

(71) Applicant: GOOGLE INC., Mountain View, CA (US)

(72) Inventor: Alexander Gorban, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/363,149

(22) Filed: Nov. 29, 2016

(65) Prior Publication Data

US 2018/0150726 A1    May 31, 2018

(51) Int. Cl.
*G06K 9/62*    (2006.01)
*G06K 9/66*    (2006.01)
*G06N 3/04*    (2006.01)

(52) U.S. Cl.
CPC ......... *G06K 9/6257* (2013.01); *G06K 9/6269* (2013.01); *G06K 9/66* (2013.01); *G06N 3/0454* (2013.01)

(58) Field of Classification Search
CPC ....... G06K 9/6257; G06K 9/6269; G06K 9/66
See application file for complete search history.

(56) References Cited

U.S. PATENT DOCUMENTS 5,929,906 A * 7/1999 Arai et al.
2016/0162760 A1* 6/2016 Skaff ................... G06K 9/66
382/159

FOREIGN PATENT DOCUMENTS

CN      103973980      8/2014
WO     20160184666    11/2016

OTHER PUBLICATIONS

Over Bischof et al: "Multispectral Classification of Landsat-Images Using Neural Networks", IEEE, 1992.*
Nguyen, R. M., et al. (Sep. 2014). Training-Based Spectral Reconstruction from a Single RGB Image. In European Conference on Computer Vision (pp. 186-201). Springer International Publishing. Sep. 2014.

(Continued)

*Primary Examiner* — Ruiping Li
(74) *Attorney, Agent, or Firm* — Middleton Reutlinger

(57) ABSTRACT

Systems, methods, and computer readable media related to training and/or using a neural network model. The trained neural network model can be utilized to generate (e.g., over a hidden layer) a spectral image based on a regular image, and to generate output indicative of one or more features present in the generated spectral image (and present in the regular image since the spectral image is generated based on the regular image). As one example, a regular image may be applied as input to the trained neural network model, a spectral image generated over multiple layers of the trained neural network model based on the regular image, and output generated over a plurality of additional layers based on the spectral image. The generated output may be indicative of various features, depending on the training of the additional layers of the trained neural network model.

11 Claims, 6 Drawing Sheets

(56) References Cited

OTHER PUBLICATIONS

European Patent Office—International Searching Authority; Notification of Transmittal of the International Search Report and the Written Opinion of PCT Serial No. PCT/US2017/054183; dated Dec. 20, 2017.
European Patent Office; Written Opinion of the International Preliminary Examining Authority of PCT Ser. No. PCT/US2017/054183; 8 pages; dated Oct. 16, 2018.
European Patent Office; International Preliminary Report on Patentability of PCT Ser. No. PCT/US2017/054183; 20 pages; dated Jan. 25, 2019.

* cited by examiner

TRAINING AND/OR USING NEURAL NETWORK MODELS TO GENERATE INTERMEDIARY OUTPUT OF A SPECTRAL IMAGE

BACKGROUND

Electronic regular images (referred to herein as "regular images") include (or are restricted to) one or more channels that each define values for a human visible spectrum. For example, a visible color image may include a red channel, a blue channel, a green channel, and/or other visible spectrum channel(s). The values defined by each of the channels of a regular image may include a value, for each of a plurality of pixels of the image, that indicates a corresponding frequency and amplitude (intensity) of the pixel in the corresponding spectrum.

Electronic spectral images (referred to herein as "spectral images") include one or more channels that each define values for a spectrum that is not human visible (and may also optionally include channel(s) that each define values for a human visible spectrum). Some explicit examples of a spectral image are a multispectral image and a hyperspectral image. For example, a spectral image may include a near-infrared channel, a mid-infrared channel, a far-infrared channel, a thermal-infrared channel, an ionizing radiation channel, a micro-wave channel, a radio wave channel, an ultra-low frequency channel, a super low frequency channel, and/or other channels that are not human visible. Also, a spectral image may include one or more channels that are each subsets of one of the aforementioned channels (or other channels). For example, multiple micro-wave channels, each covering a different range of frequencies, may be provided in lieu of a single micro-wave channel. The values defined by each of the channels of a spectral image may include a value, for each of a plurality of pixels of the image, that indicates a corresponding frequency of the pixel in the corresponding spectrum.

SUMMARY

This specification is directed generally to systems, methods, and computer readable media related to training and/or using a neural network model that can be utilized to generate (e.g., over a hidden layer) a spectral image that corresponds to a regular image, and generate output indicative of one or more features present in the spectral image (and present in the regular image since the spectral image is generated based on the regular image).

As one example, a regular image may be applied as input to a trained neural network model, a spectral image generated over multiple layers of the trained neural network model based on the regular image, and output generated over a plurality of additional layers based on the spectral image. The generated output may be indicative of various features, depending on the training of the additional layers of the trained neural network model. For example, the generated output may indicate a classification of one or more objects that are present, location(s) of one or more present objects, one or more states of objects that are present, one or more materials of objects that are present, and/or other feature(s).

Spectral images include richer data (e.g., a higher level of spectral details, better capability to see the unseen) than regular images. As a result, a neural network model trained based solely on training examples that each include spectral image training example input may provide better performance than a neural network model trained based solely on training examples that each include regular images. However, a neural network model trained based solely on training examples that each include spectral image training example input may require relatively large amounts of labeled spectral image data, which may be scarce and/or expensive to produce. Moreover, a neural network model trained based solely on training examples that each include spectral image training example input requires that the trained model be utilized with inputs that are themselves spectral images. Devices that capture spectral images may be expensive, limiting the utility of such a trained model.

Accordingly, various implementations described herein train a first neural network portion that enables a regular image to be applied as input to the first neural network portion and a spectral image that corresponds to the regular image to be generated over the first neural network portion based on the input. Further, a second neural network portion is trained that enables a spectral image to be applied as input to the second neural network portion and an output indicative of one or more features of the spectral image to be generated over the second neural network portion based on the input.

In some of those various implementations, the first neural network portion and the second neural network portion may initially be trained separately. They may initially be trained separately while joined together in a combined neural network model and/or may initially be trained separately while not being joined together in a combined neural network model (e.g., while existing as two separate modules). For example, the first neural network portion may be trained based on training examples that each include training example input that is based on a regular image and training example output that is based on a spectral image that corresponds to the regular image (e.g., that was captured from the same/similar point of view). Also, for example, the second neural network portion may be initially trained based on training examples that each include training example input that is based on a spectral image and training example output that indicates corresponding value(s) for feature(s) of the spectral image. In many implementations, the initial training of the second neural network portion may be based on fewer training examples than is the initial training of the first neural network portion.

When the first and second neural network portion are joined together in a combined neural network model, a regular image may be applied as input to the first portion and hidden layers of the first portion utilized to generate, based on the input, a spectral image that corresponds to the regular image. The spectral image may be applied as input to the second portion and hidden layers of the second portion utilized to generate, based on the spectral image, corresponding value(s) for feature(s) of the spectral image.

In some implementations, after the initial training and when the first and second neural network portion are joined as a combined neural network model, at least the second neural network portion may be fine-tuned (i.e., further trained) based on applying training examples over both the first portion and the second portion of the combined neural network model. For example, training examples may be applied that each include training example input that is based on a regular image and training example output that indicates corresponding value(s) for features of the regular image. For instance, regular image training example input of a training example may be applied as input to the model, a predicted output generated based on the input and over both the first portion and the second portion, and an error back-propagated over at least (and optionally only) the second portion based on a comparison of the predicted output to the training example output. Such training may enable the second portion to be further trained with an optionally more extensive labeled set of regular image training examples and/or may enable the second portion to adapt to differences between spectral images generated based on the first portion and spectral images of training examples utilized in prior training of the second portion.

In some implementations, a method performed by one or more processors is provided that includes identifying a first group of training examples. Each of the training examples of the first group includes: regular image training example input that is based on a corresponding regular image; and spectral image training example output that is based on a corresponding spectral image that corresponds to the regular image. The spectral image training example output includes one or more non-visible channels that are not included in the regular image. The method further includes training a first neural network portion based on the first group of training examples. The first neural network portion has a first portion input layer with a first shape that conforms to the regular image training example output and a first portion output layer with a second shape that conforms to the spectral training example output. The method further includes identifying a second group of training examples. Each of the training examples of the second group includes: spectral image training example input that is based on a corresponding spectral image; and training example output that indicates one or more values for one or more features derivable from the corresponding spectral image. The method further includes training a second neural network portion based on the second group of training examples. The second neural network portion has a second portion input layer with the second shape that conforms to the first portion output layer and a second portion output layer with a third shape that conforms to the training example output. The method further includes joining the first portion output layer of the first neural network portion with the second portion input layer of the second neural network portion to create a combined neural network model.

These and other implementations of technology disclosed herein may optionally include one or more of the following features.

In some implementations, the method further includes: applying a regular image as input to the first portion input layer of the combined neural network model; and generating an output based on applying the input. The generating is over both the first neural network portion and the second neural network portion of the combined neural network model. In some versions of those implementations, the method further includes: assigning, to the regular image in one or more computer readable media, content that is based on the generated output. In some versions of those implementations, the method further includes, after the joining and before the applying: identifying an additional training example that includes: a given training example input that is based on a given regular image, and a given training example output that indicates one or more given values for the one or more features; and further training at least the second neural network portion of the combined neural network model based on the additional training example. The further training may include: applying the given training example input to the first portion input layer; generating, a predicted output based on applying the input, the generating being over both the first neural network portion and the second neural network portion of the combined neural network model; and updating one or more values of the second neural network portion based on a gradient determined based on the predicted output and the given training example output.

In some implementations, the method further includes, after the joining and after training the second neural network portion based on the second group of training examples: identifying an additional training example that includes: a given training example input that is based on a given regular image, and a given training example output that indicates one or more given values for the features; and further training at least the second neural network portion of the combined neural network model based on the additional training example. The further training may include applying the given training example input to the first portion input layer; generating a predicted output based on applying the input, the generating being over both the first neural network portion and the second neural network portion of the combined neural network model; and updating one or more values of the second neural network portion based on a gradient determined based on the predicted output and the given training example output.

In some implementations, the joining occurs subsequent to training the first neural network portion based on the first group of training examples and subsequent to training the second neural network portion based on the second group of training examples.

In some implementations, the joining occurs prior to training the first neural network portion based on the first group of training examples and prior to training the second neural network portion based on the second group of training examples.

In some implementations, the regular image training example inputs of the first group of training examples each consist of a plurality of visible spectrum channels of a corresponding regular image.

In some implementations, training the first neural network portion based on the first group of training examples includes: applying, as an input to an input layer of the first neural network portion, the regular image training example input of one of the training examples of the first group; generating, over the first neural network portion and based on the input, predicted spectral image output; determining a gradient based on comparison of the predicted spectral image output and the spectral image training example output of the training example; and updating the first neural network portion based on the gradient.

In some implementations, training the second neural network portion based on the second group of training examples comprises: applying, as an input to the input layer of the second neural network portion, the spectral image training example input of one of the training examples of the second group; generating, over the second neural network portion and based on the input, a predicted output; determining a second gradient based on a comparison of the predicted output and the training example output of the one of the training examples; and updating the second neural network portion based on the second gradient.

In some implementations, the features indicate a plurality of classes and the values for each of the training example outputs each indicate whether a corresponding one of the classes is present in a corresponding spectral training example input.

In some implementations, a method performed by one or more processors is provided that includes applying a regular image as input to an initial input layer of a trained neural network model; generating, based on the input and over a plurality of first hidden layers downstream from the initial input layer, a predicted spectral image that corresponds to the regular image; generating, based on the predicted spectral image and over a plurality of second hidden layers downstream from the first hidden layers, a predicted output.

These and other implementations of technology disclosed herein may optionally include one or more of the following features.

In some implementations, the method further includes assigning, to the regular image in one or more computer readable media, content that is based on the generated predicted output.

In some implementations, the predicted output indicates at least one material that is present in the regular image and/or a classification of an object in the regular image.

In some implementations, a method performed by one or more processors is provided that include: applying, as input to a first portion of a neural network model: a regular image training example input that is based on a regular image; generating, over the first portion based on applying the input, a predicted spectral image; updating the first portion based on comparison of the predicted spectral image to a spectral image training example output, the spectral image training example output being based on a spectral image that corresponds to the regular image; applying, as input to a second portion of the neural network model, spectral image training example input; generating, over the second portion based on applying the input, a predicted output; and updating the second portion based on comparison of the predicted output to a training example output that corresponds to the spectral training example input. In some of those implementations, updating the second portion based on the comparison occurs without updating of the first portion based on the comparison.

Other implementations may include a non-transitory computer readable storage medium storing instructions executable by a processor (e.g., a central processing unit (CPU), graphics processing unit (GPU), and/or Tensor Processing Unit (TPU)) to perform a method such as one or more of the methods described above. Yet another implementation may include a system of one or more computers that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Spectral images include richer data (e.g., a higher level of spectral details, better capability to see the unseen) than regular images. As a result, a neural network model trained based solely on training examples that each include spectral image training example input may provide better performance than a neural network model trained based solely on training examples that each include regular images. However, a neural network model trained based solely on training examples that each include spectral image training example input may require relatively large amounts of labeled spectral image data, which may be scarce and/or expensive to produce. Additionally or alternatively, a neural network model trained based solely on training examples that each include spectral image training example input requires that the trained model be utilized with inputs that are themselves spectral images. Devices that capture spectral images may be expensive, limiting the utility of such a trained model.

Accordingly, various implementations described herein train a first neural network portion that enables a regular image to be applied as input to the first neural network portion and a spectral image that corresponds to the regular image to be generated over the first neural network portion based on the input. Further, a second neural network portion is trained that enables a spectral image to be applied as input to the second neural network portion and an output indicative of one or more features of the spectral image to be generated over the second neural network portion based on the input.

When the first and second neural network portion are joined as a combined neural network model, a regular image may be applied as input to the first portion and hidden layers of the first portion utilized to generate, based on the input, a spectral image that corresponds to the regular image. The spectral image may be applied as input to the second portion and hidden layers of the second portion utilized to generate, based on the spectral image, corresponding value(s) for feature(s) of the spectral image.

Figure 1:
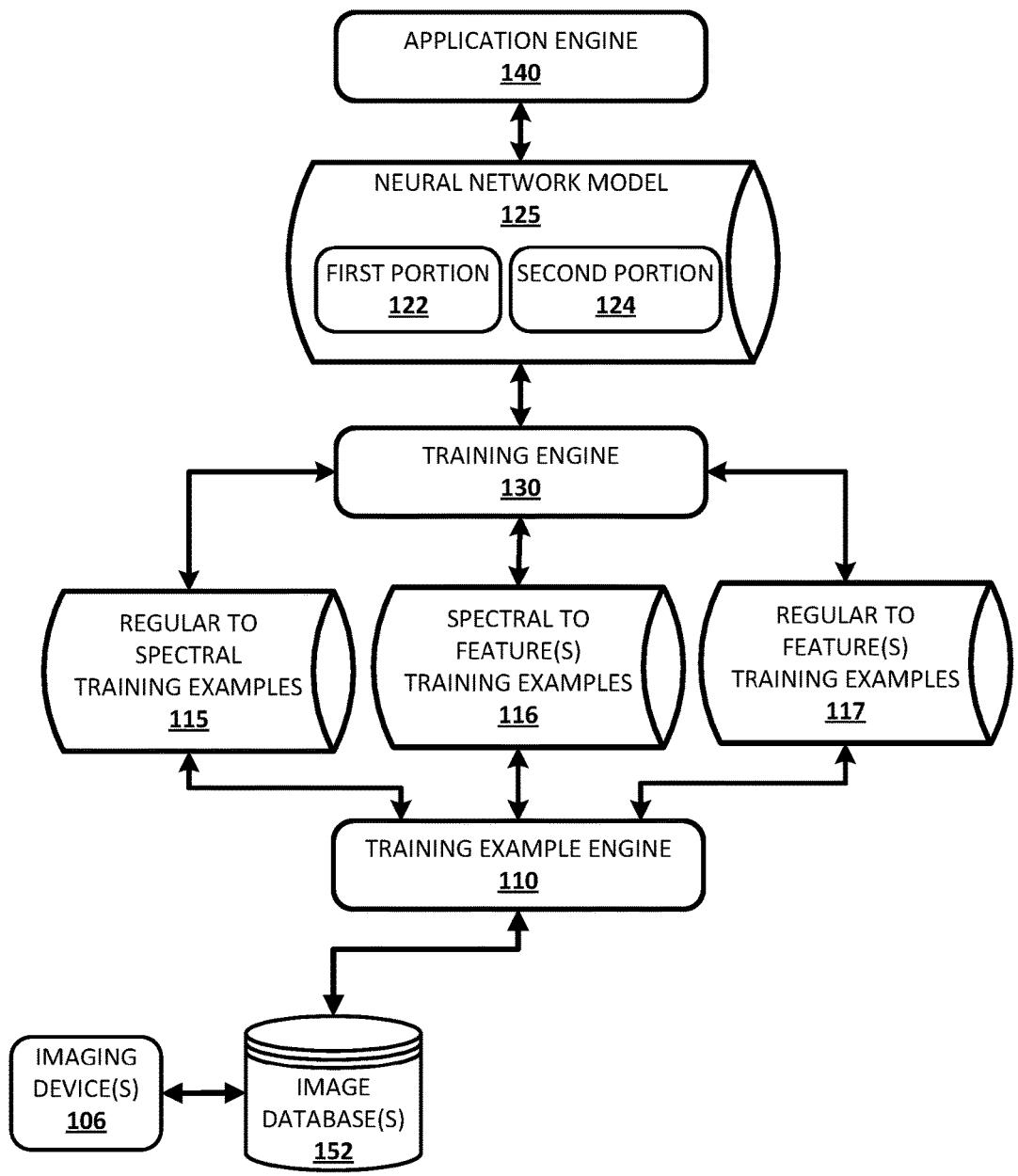
FIG. 1 is a block diagram of an example environment in which implementations disclosed herein may be implemented.

FIG. 1 illustrates a block diagram of an example environment in which implementations disclosed herein may be implemented. The example environment includes a neural network model 125, an application engine 140, a training engine 130, and a training example engine 110. The example environment further includes one or more imaging systems 106, one or more image databases 152, and various groups of training examples 115, 116, and 117.

In some implementations, the neural network model 125 includes a first portion 122 and a second portion 124 that is downstream (e.g., immediately downstream) from the first portion 122. In some of those implementations, when the neural network model 125 has been trained by the training engine 130, the application engine 140 may apply a regular image as input to the first portion 122. The application engine 140 may generate a spectral image that corresponds to the regular image over the first portion 122 based on the input. Further, the application engine 140 may apply the generated spectral image as input to the second portion 124 and may generate, over the second portion based on the input, an output that indicates value(s) for feature(s) of the spectral image.

Accordingly, the application engine 140 may apply a regular image to the neural network model 125 and generate, over the neural network model 125 based on the applied regular image, value(s) for feature(s) indicated by the regular image. Notably, in various implementations the application engine 140 generates, as intermediary output over the neural network model 125, a spectral image that corresponds to the regular image, and applies the spectral image over additional layers of the neural network model 125 to generate the output. In some of those implementations, generation and application of a spectral image based on the neural network model 125 may provide improved performance relative to neural network models that do not generate a spectral image as intermediary output and/or that are not trained utilizing training examples based on spectral images.

The output generated over the trained neural network model 125 by the application engine 140 may be indicative of various features, depending on the training performed by the training engine 130. For example, the generated output may indicate a classification of one or more objects that are present, location(s) of one or more present objects, one or more states of objects that are present, one or more materials of objects that are present, and/or other feature(s).

The application engine 140 may be implemented at least in part by one or more processors (e.g., GPU(s), CPU(s), and/or TPU(s)) of various devices and may utilize the output generated over the neural network model 125 for various purposes. For example, the application engine 140 may be implemented by one or more computing devices of an image service and may utilize output generated over neural network model 125 to determine labels for various regular images and may store the labels in association with their corresponding regular images. Also, for example, the application engine 140 may be implemented by one or more processors of a robot and may utilize output generated over the neural network model 125 to determine various features in regular images captured by camera(s) of the robot, and to adapt behavior of the robot based on the determined features. As yet another example, the application engine 140 may be implemented on a client computing device, and may utilize output generated over the neural network model 125 to determine whether a regular image captured by a camera of the client computing device includes a user that is an authorized user of the client computing device.

In some implementations, the trained neural network model 125 may be stored locally on the device(s) that implement the application engine 140. In some other implementations, the trained neural network model 125 may be stored remote from the device(s) that implement the application engine 140. In some of those other implementations, the application engine 140 may interface with the trained neural network model 125 via one or more networks such as the Internet.

The training example engine 110 may generate various training examples to enable the training engine 130 to train the neural network model 125. In some implementations, the training example engine 110 generates regular to spectral training examples 115, spectral to feature(s) training examples 116, and/or regular to feature(s) training examples 117. The training examples 115, 116, and/or 117 may be stored on one or more non-transitory computer readable media.

In some implementations, the training example engine 110 generates one or more of the training examples 115, 116, and/or 117 based on image database(s) 152 and/or other resource. Image database(s) 152 may include various regular and/or spectral (e.g., hyperspectral and/or multispectral) images captured by corresponding imaging systems 106, and may optionally include one or more labels of one or more feature(s) of the corresponding images.

The regular to spectral training examples 115 each include training example input that is based on a regular image and training example output that is based on a spectral image that corresponds to the regular image. For example, each of the training examples of regular to spectral training examples 115 may have training example input that is a regular image with dimensions of X×Y×M (X pixels wide, Y pixel height, M channels (e.g., red, green, blue, and/or other visible spectrum(s))). Each of the regular to spectral training examples 115 may further have training example output that is a corresponding spectral image with dimensions of X×Y×N (X pixels wide, Y pixel height, N channels (where the N channels include channels, some of which may not be human visible and that are in addition to those of the regular image)). The shape (dimensions) of the training example inputs of examples 115 may depend on the shape of the initial input layer of the neural network model 125 (e.g., the input layer of the first portion 122) and the shape of the training example outputs may depend on the layer of the neural network model 125 that approximates the spectral image (e.g., the output layer of the second portion 124). In many implementations, the training example outputs of examples 115 will include many more channels (N) than are included in the training example inputs (M). In some implementations, the width and/or height dimensions of the training example inputs of examples 115 may vary from the width and/or height dimensions of the training example outputs of examples 115.

In some implementations, a regular image on which a training example input of examples 115 is based may be one from image database(s) 152 that was captured by one of the imaging devices 106 that is a regular imaging device (e.g., that captures visible spectra). In some of those implementations, the spectral image on which a corresponding training example output is based may be one from image database(s) 152 that is captured by one of the imaging devices 106 that is a spectral imaging device (e.g., that may capture parts of spectra that are not human visible). The spectral image and the regular image may be captured from the same/similar vantage and/or under similar conditions and may optionally capture (or be cropped to include) the same scene. In some other implementations, the spectral image on which a corresponding training example output is based may be one that is a "transform" of the regular image using equations and/or other rules based approaches.

The spectral to feature(s) training examples 116 each include training example input that is based on a spectral image and training example output that indicates corresponding value(s) for feature(s) of the spectral image. For example, each of the training examples of spectral to feature(s) training examples 116 may have training example input that is a spectral image with dimensions of X×Y×N (X pixels wide, Y pixel height, N channels (where the N channels include channels, some of which may not be human visible and that are in addition to those of the regular image)). In many implementations, the shape (dimension) of the training example inputs may be the same as the shape of the training example outputs of the regular to spectral training examples 115, and may also conform to the shape of the initial input layer of the second portion 124. Each of the training example outputs of examples 116 may have a shape that is dictated by the feature(s) to be determined based on the neural network model 125. For example, where the feature(s) to be determined is to which class(es), of Z separate classes, objects in an input spectral image belong, the training example outputs may each be a Z×1 matrix, with each of the values of the matrix indicating a likelihood that a corresponding class is present (or not) in the corresponding training example input.

In some implementations, a spectral image on which a training example input of examples 116 is based may be one from image database(s) 152 that was captured by one of the imaging devices 106 that is a spectral imaging device (e.g., that may capture parts of spectra that are not human visible). The corresponding training example output may be based on manually labeled and/or otherwise determined values for features of the spectral image.

The regular to feature(s) training examples 117 each include training example input that is based on a regular image and training example output that indicates corresponding value(s) for feature(s) of the regular image. For example, each of the training examples of regular to feature(s) training examples 117 may have training example input that is a regular image with dimensions of X×Y×M (X pixels wide, Y pixel height, M channels (e.g., red, green, blue, and/or other visible spectrum(s))). In many implementations, the shape (dimension) of the training example inputs of examples 117 may be the same as the shape of the training example inputs of the regular to spectral training examples 115, and conform to the shape of the initial input layer of the first portion 122. Each of the training example outputs of examples 117 may have a shape that is dictated by the feature(s) to be determined based on the neural network model 125. For example, where the feature(s) to be determined is to which class(es), of Z separate classes, objects in an input regular image belong, the training example outputs may each be a Z×1 matrix, with each of the values of the matrix indicating a likelihood that a corresponding class is present (or not) in the corresponding training example input. In many implementations, the shape (dimension) of the training example outputs of examples 117 may be the same as the shape of the training example outputs of the spectral to feature(s) training examples 116, and conform to the shape of the output layer of the second portion 124.

In some implementations, a regular image on which a training example input of examples 117 is based may be one from image database(s) 152 that was captured by one of the imaging devices 106 that is a regular imaging device. The corresponding training example output may be based on manually labeled and/or otherwise determined values for features of the regular image.

The training engine 130 utilizes the training examples 115, 116, and/or 117 to train the neural network model 125. In some implementations, the training engine 130 at least initially trains the first portion 122 and the second portion 124 separately. They may initially be trained separately while being joined as a combined neural network model 125 and/or while not being joined as a combined neural network model 125.

For example, the training engine 130 may utilize the regular to spectral training examples 115 to train the first portion 122 and may utilize the spectral to feature(s) training examples 116 to train the second portion 124. For instance, in training the first portion 122, the training engine 130 may: apply, as input to the first portion 122, training example input(s) from the examples 115; generate output over the current version of the first portion 122 based on the input; and backpropagate error over the first portion 122 based on the generated output and corresponding training example output(s) from the examples 115 (e.g., based on a gradient determined based on comparing the generated output to the training example output(s)). Also, for instance, in training the second portion 124, the training engine 130 may: apply, as input to the second portion 124, training example input(s) from the examples 116; generate output over the current version of the second portion 124 based on the input; and backpropagate error over the second portion 124 based on the generated output and corresponding training example output(s) from the examples 116 (e.g., based on a gradient determined based on comparing the generated output to the training example output(s)). In some implementations, the training engine 130 may train the second portion 124 based on a quantity of training examples (from examples 116) that is a lesser quantity than a quantity of training examples (from examples 115) utilized to train the first portion 122.

In some implementations, the training engine 130 additionally or alternatively trains at least the second portion 124 based on applying regular to feature(s) training examples 117 over both the first portion 122 and the second portion 124 of the neural network model 125. For example, the training engine 130 may: apply training example input of training examples 117 as input to the first portion 122; generate a predicted output based on the input and over both the first portion 122 and the second portion 124; and backpropogate error over at least (and optionally only) the second portion 124 based on the generated output and corresponding training example output(s) from the examples 117 (e.g., based on a gradient determined based on comparing the generated output to the training example output(s)). Such training may enable the second portion 124 to be further trained with an optionally more extensive labeled set of regular image training examples and/or may enable the second portion 124 to adapt to differences between spectral images generated based on the first portion and spectral images of training examples (e.g., of training examples 116) previously utilized in the initial training of the second portion 124.

Although a single neural network model 125 is illustrated in FIG. 1, in some implementations, multiple neural network models may be trained according to techniques disclosed herein. In some of those implementations, the training engine 130 may: train the first portion 122 and utilize the trained first portion 122 in each of the multiple neural network models; and train each second portion of the multiple neural network models to predict different output feature(s). This may enable reuse of the trained first portion 122 across various neural network models. The neural network models that incorporate the trained first portion 122 may be further trained (e.g., both the first portion 122 and the corresponding second portion, or only the corresponding second portion) based on applying training example inputs across the entire neural network model.

Figure 2:
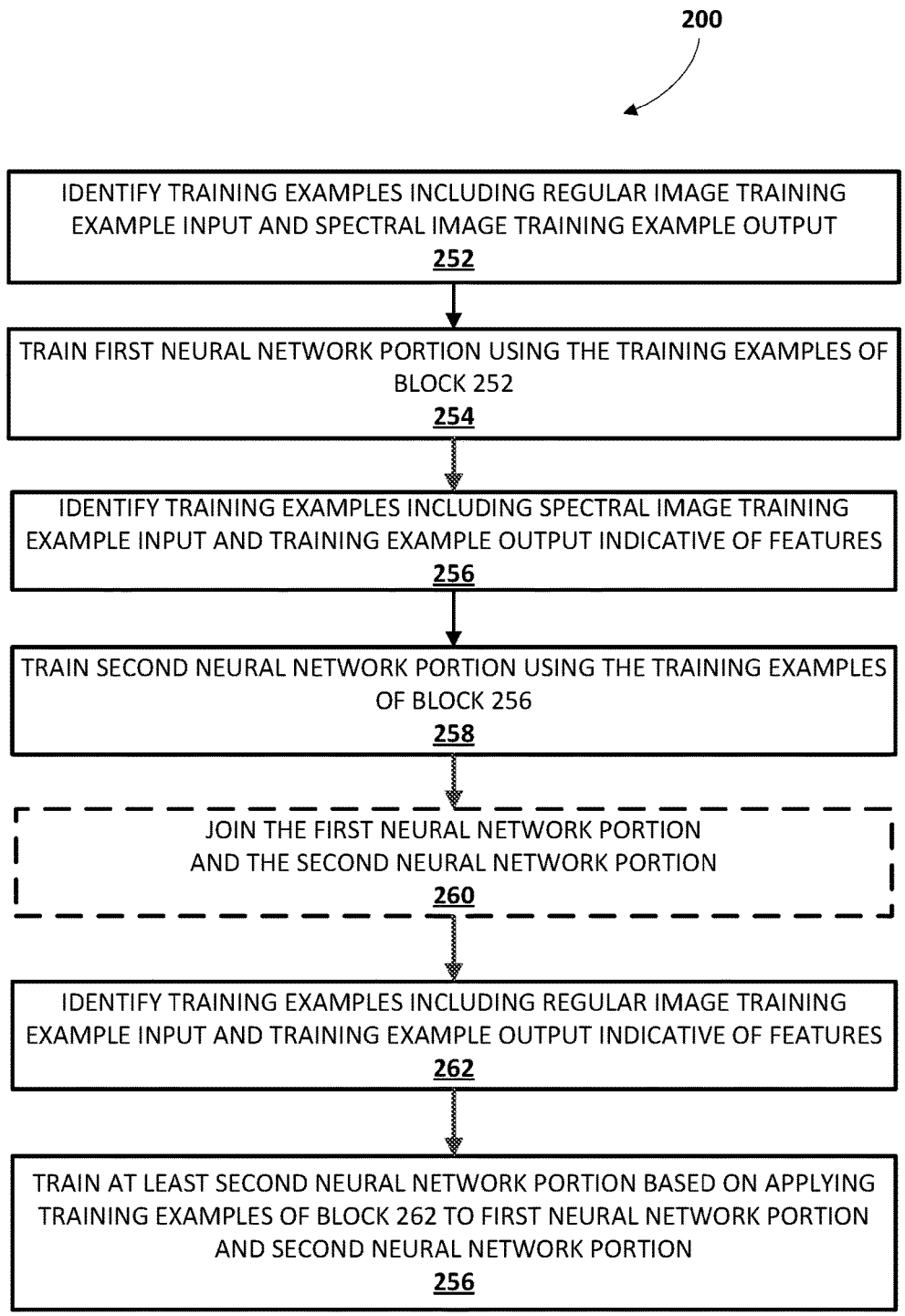
FIG. 2 is a flowchart illustrating an example method of training a neural network model according to some implementations disclosed herein.

Some additional examples of training of the neural network model 125 that may be performed by training engine 130 in various implementations is described with reference to FIGS. 2 and 3.

Figure 6:
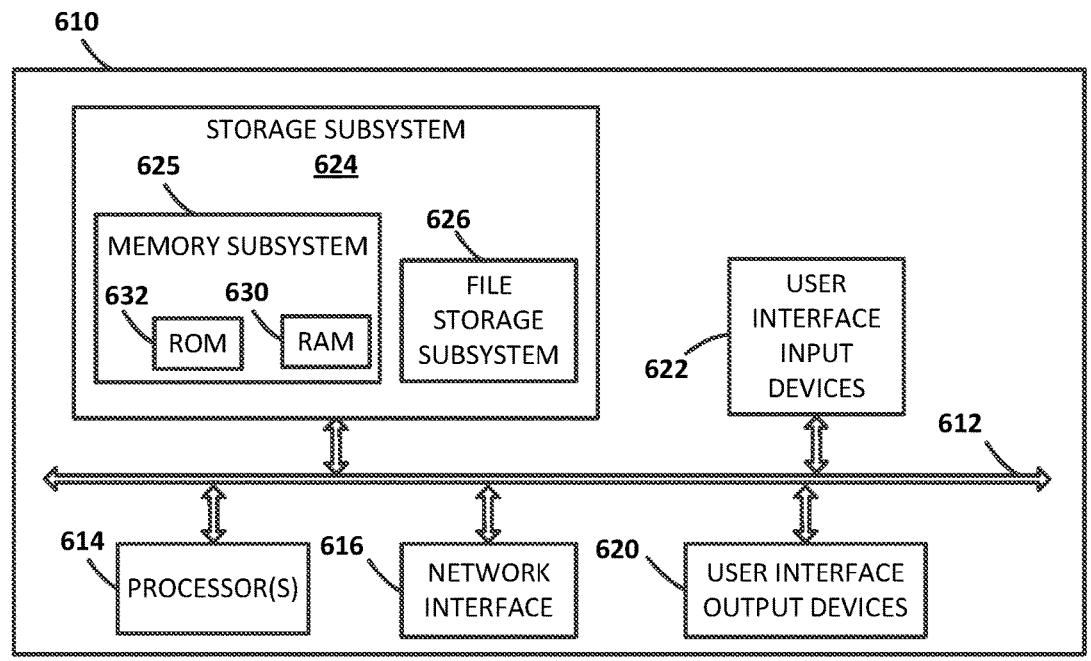
FIG. 6 illustrates an example architecture of a computing device.

With reference to 2, a flowchart illustrating an example method 200 of training a neural network model according to some implementations disclosed herein is illustrated. For convenience, the operations of the flow chart are described with reference to a system that performs the operations. This system may include one or more components, such as a processor (e.g., CPU, GPU, and/or TPU) of training engine 130 and/or of computing device 610 (FIG. 6). While operations of method 200 are shown in a particular order, this is not meant to be limiting. One or more operations may be reordered, omitted or added.

At block 252, the system identifies training examples that each include regular image training example input and spectral image training example output.

At block 254, the system trains a first neural network portion using the training examples of block 252.

At block 256, the system identifies training examples that each include spectral image training example input and training example output that is indicative of feature(s) of the corresponding spectral image training example input.

At block 258, the system trains a second neural network portion using the training examples of block 256.

At optional block 260, the system joins the first neural network portion and the second neural network portion. Block 260 is included in FIG. 2 with dashed lines to indicate that it is optional in many implementations. For example, in some implementations, the first neural network portion and the second neural network portion may have already been joined prior to method 200. For example, blocks 252, 254, 256, and 258 may be performed while the first neural network portion and the second neural network portion are already joined.

At block 262, the system identifies training examples that each include regular image training example input and training example output indicative of feature(s).

At block 256, the system trains at least the second neural network portion based on applying the training examples of block 262 to the first neural network portion and the second neural network portion.

In some implementations, the system may optionally utilize the trained first neural network portion in one or more additional neural network models. For example, the system may train an additional second portion of an additional neural network model based on training examples that include spectral image training example input and training example output that is indicative of different feature(s) than those features of block 256. The system may join the trained first neural network portion and the additional second neural network portion (before or after training of the additional second neural network portion). The system may optionally further train the additional neural network model (e.g., both the first portion and the additional second portion, or only the additional second portion) based on applying training example inputs across the entire neural network model.

Although only a first portion and a second portion of a neural network model are described herein, in some implementations the first portion and/or the second portion may be joined with one or more additional portions in neural network model. For example, the output generated over the second portion may be fed into a third neural network portion that is downstream from the second portion. Also, for example, the output generated over the first portion may be fed into both the second portion and a third neural network portion that is downstream from the first neural network portion.

With reference to 3, a flowchart illustrating another example method 300 of training a neural network model according to some implementations disclosed herein is illustrated. Method 300 may be performed in addition to, or in lieu of, the method 200. For convenience, the operations of the flow chart are described with reference to a system that performs the operations. This system may include one or more components, such as a processor (e.g., CPU, GPU, and/or TPU) of training engine 130 and/or of computing device 610 (FIG. 6). While operations of method 300 are shown in a particular order, this is not meant to be limiting. One or more operations may be reordered, omitted or added.

Figure 3:
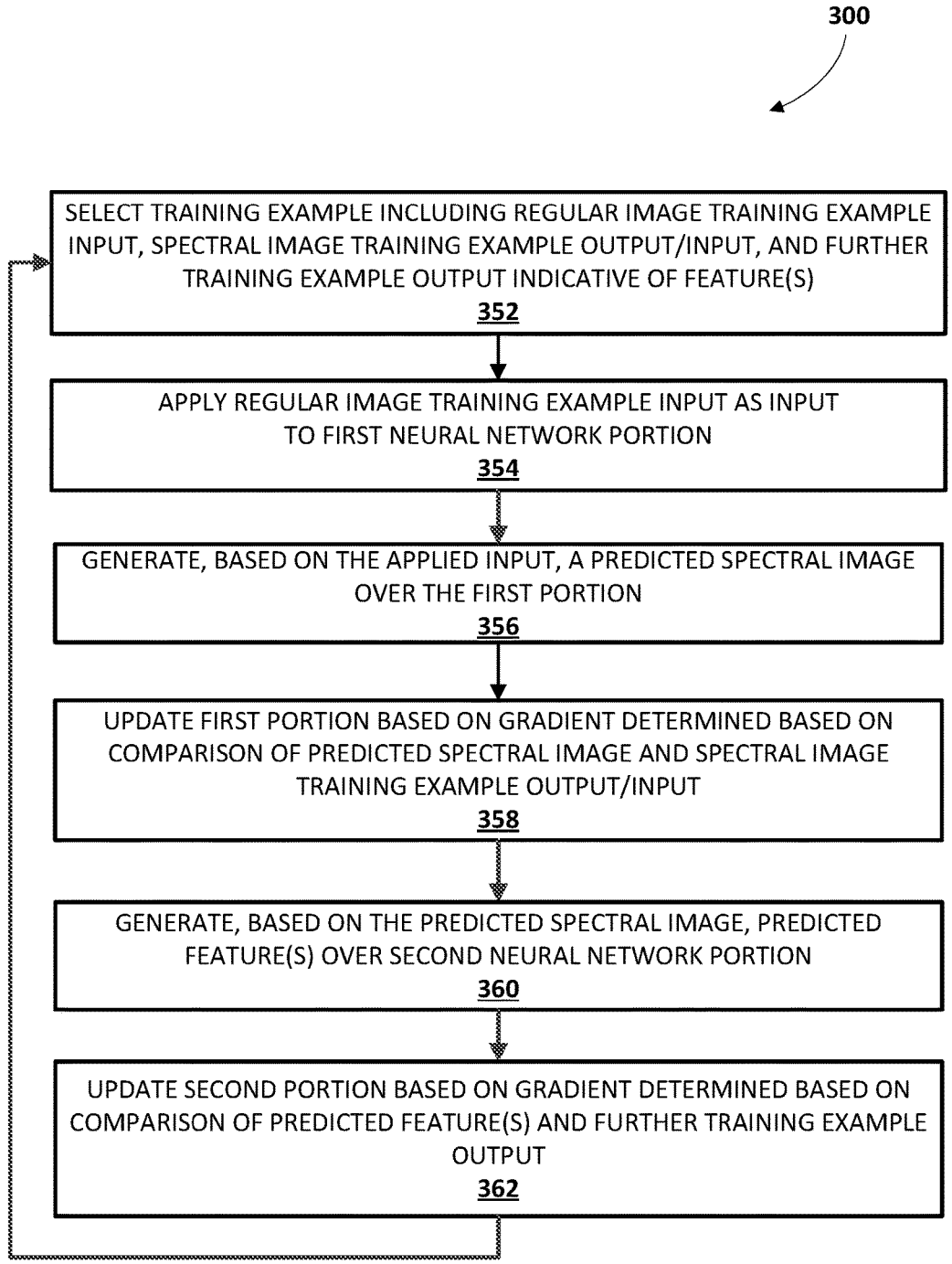
FIG. 3 is a flowchart illustrating an additional example method of training a neural network model according to some implementations disclosed herein.

FIG. 3 is an example of training that may occur (in addition to or instead of that of FIG. 2) based on training examples that are "hybrids" of the regular to spectral training examples 115 and the training examples 116 and/or 117. Those "hybrid" training examples include regular image training example input, spectral training example output (for determining an error of output generated over the first portion), and further training example output indicative of feature(s) (for determining an error of output generated over the second portion).

At block 352, the system selects a training example that includes regular image training example input, spectral training example output, and further training example output indicative of feature(s) of the corresponding visible training example input and spectral image training example output.

At block 354, the system applies the regular image training example input as input to a first neural network portion.

At block 356, the system generates, based on the applied input, a predicted spectral image over the first portion.

At block 358, the system updates the first portion based on a gradient determined based on comparison of the predicted spectral image generated at block 356 and the spectral image training example output.

At block 360, the system generates, based on the predicted spectral image of block 356, predicted feature(s) over a second neural network portion. In some other implementations the system may additionally or alternatively generate predicted feature(s) over the second neural network portion based on the hyperspectral training example output.

At block 362, the system updates the second portion based on a gradient determined based on comparison of the predicted features generated at block 360 and the further training example output.

Figure 4:
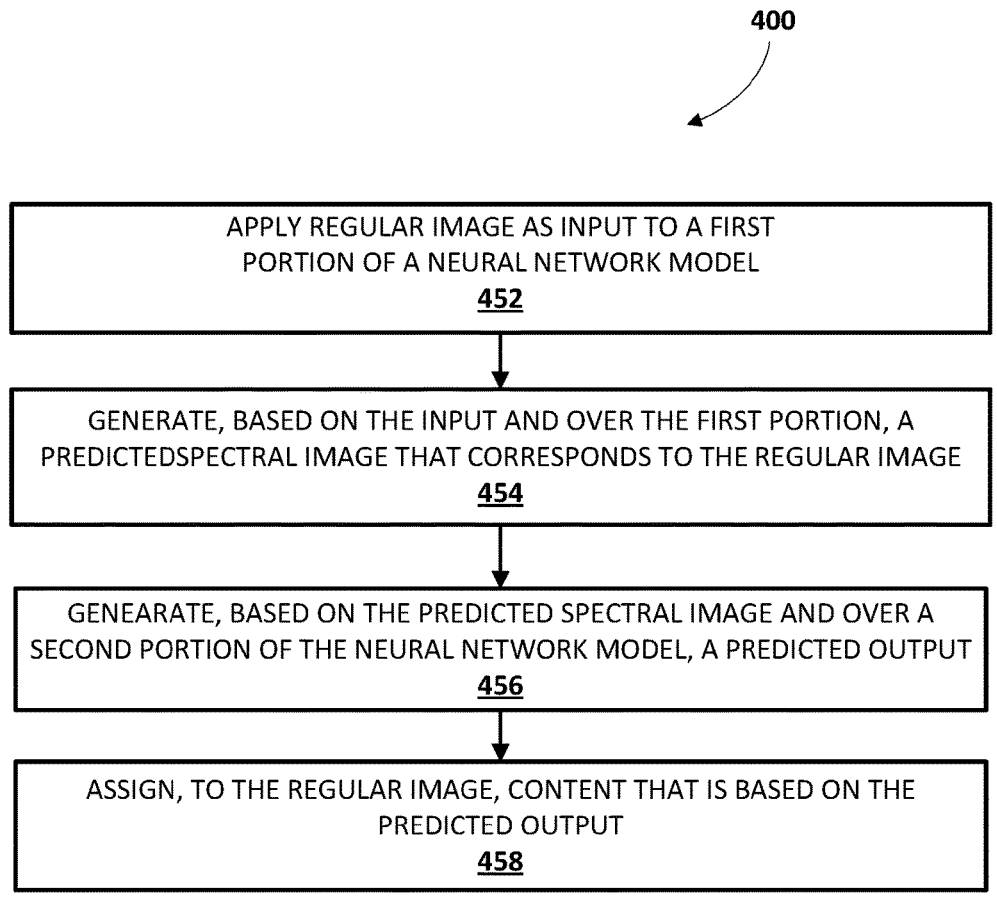
FIG. 4 is a flowchart illustrating an example method of using a trained neural network model according to some implementations disclosed herein.

With reference to FIG. 4, a flowchart illustrating an example method 400 of using a trained neural network model according to some implementations disclosed herein is illustrated. Method 400 may be performed over a trained neural network model, such as a neural network model trained based on method 200 and/or 300. For convenience, the operations of the flow chart are described with reference to a system that performs the operations. This system may include one or more components, such as a processor (e.g., CPU, GPU, and/or TPU) application engine 140 and/or computing device 610 (FIG. 6). While operations of method 400 are shown in a particular order, this is not meant to be limiting. One or more operations may be reordered, omitted or added.

At block 452, the system applies a regular image as input to a first portion of a neural network model. The system may optionally preprocess the regular image before block 452 to, for example, adapt a shape of the regular image to the input shape of the first portion.

At block 454, the system generates, based on the input and over the first portion, a predicted spectral image that corresponds to the regular image.

At block 456, the system generates, based on the predicted spectral image and over a second portion of the neural network model, a predicated output.

At block 458, the system assigns, to the regular image, content that is based on the predicted output. For example, the system may assign the content to the regular image in memory and/or other computer readable media. As described herein, the system and/or a separate system may optionally perform one or more further actions based on the assigned content.

Figure 5:
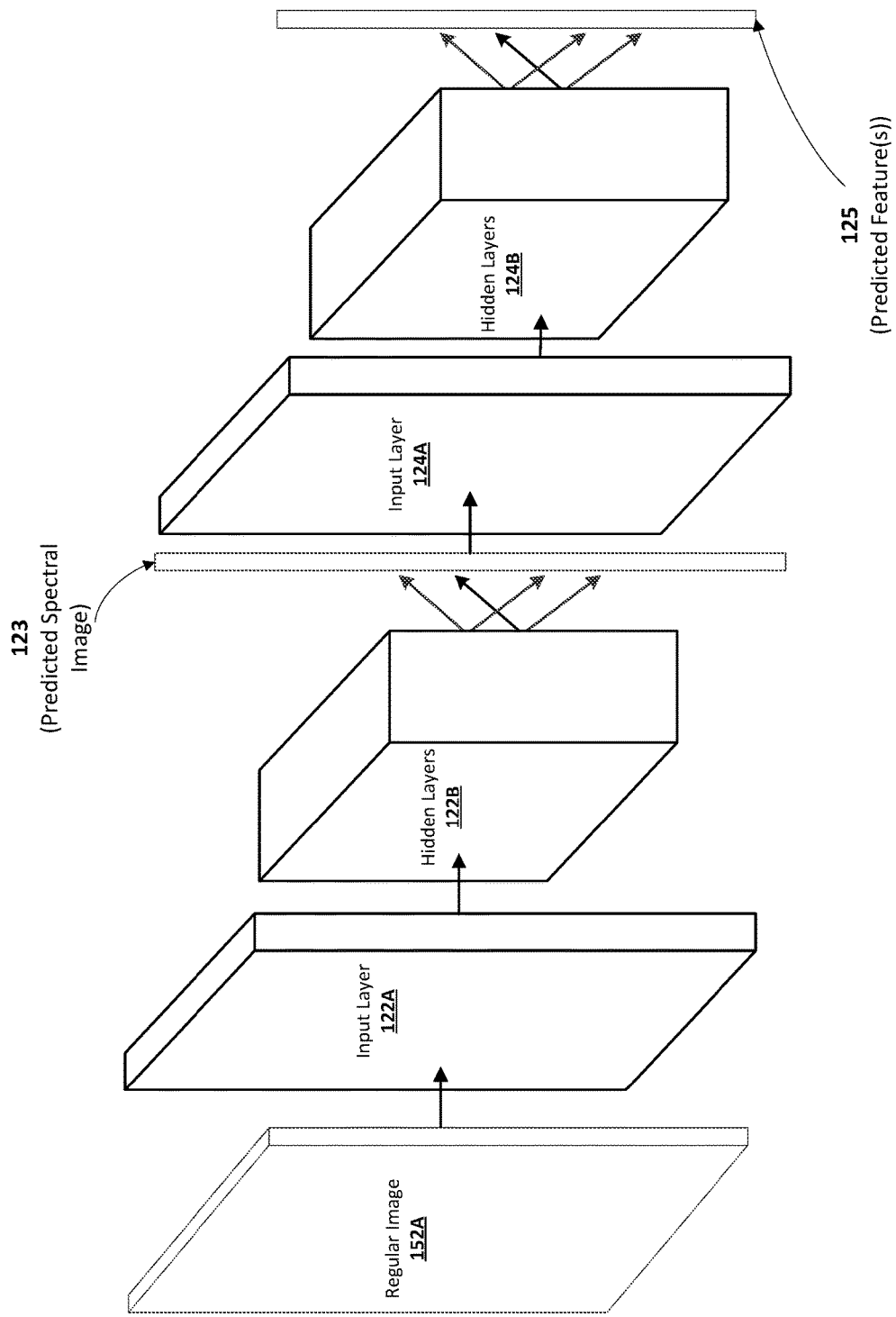
FIG. 5 illustrates an architecture of an example neural network model according to some implementations disclosed herein.

FIG. 5 illustrates an architecture of an example neural network model according to some implementations disclosed herein. FIG. 5 also illustrates an example of a regular image 152A that may be applied as input over the neural network model, a predicted spectral image 123 that may be generated as intermediary output over a first portion of the neural network model, and predicted features 125 that may be generated over a second portion of the neural network model based on the predicted spectral image 123.

The neural network model of FIG. 5 includes a first portion with an input layer 122A and one or more hidden layers 122B. The neural network model further includes a second portion with an input layer 124A and one or more hidden layers 124B. The input layer 124A of the second portion is referenced as an input layer in that it receives the predicted spectral image 123 generated over the first portion. However, it is understood that the input layer 124A itself may also be a hidden layer in many implementations.

In some implementations, the neural network model of FIG. 5 and/or other neural network models referenced herein are convolutional neural network models. Generally, a convolutional neural network model is a multilayer learning framework that includes an input layer, one or more convolutional layers, optional weight and/or other layers, and an output layer. During training, a convolutional neural network is trained to learn a hierarchy of feature representations. Convolutional layers of the network are convolved with filters and optionally down-sampled by pooling layers. Generally, the pooling layers aggregate values in a smaller region by one or more downsampling functions such as max, min, and/or normalization sampling. For example, one or more of the hidden layers 122B, 124B and/or the input layers 124A and/or 122B may be a convolutional layer, a pooling layer, and/or other layer of a convolutional neural network.

FIG. 6 is a block diagram of an example computing device 610 that may optionally be utilized to perform one or more aspects of techniques described herein. In some implementations, one or more of application engine 130, training engine 130, and/or training example engine 110, and/or other component(s) may be implemented by one or more components of the example computing device 610.

Computing device 610 includes at least one processor 614 (e.g., a CPU, GPU, and/or TPU) which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 2 and/or the method of FIG. 3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
identifying a first group of training examples, wherein each of the training examples of the first group includes:
regular image training example input that is based on a corresponding regular image; and
spectral image training example output that is based on a corresponding spectral image that corresponds to the regular image, wherein the spectral image training example output includes one or more non-visible channels that are not included in the regular image;
training a first neural network portion based on the first group of training examples,
the first neural network portion having a first portion input layer with a first shape that conforms to the regular image training example input and a first portion output layer with a second shape that conforms to the spectral training example output;
identifying a second group of training examples, wherein each of the training examples of the second group includes:
spectral image training example input that is based on a corresponding spectral image; and
training example output that indicates one or more values for one or more features derivable from the corresponding spectral image;
training a second neural network portion based on the second group of training examples,
the second neural network portion having a second portion input layer with the second shape that conforms to the first portion output layer and a second portion output layer with a third shape that conforms to the training example output;
joining the first portion output layer of the first neural network portion with the second portion input layer of the second neural network portion to create a combined neural network model;
identifying an additional training example, wherein the additional training example includes:
a given training example input that is based on a given regular image; and
a given training example output that indicates one or more given values for the one or more features;
further training at least the second neural network portion of the combined neural network model based on:
applying the given training example input to the first portion input layer;
generating, a predicted output based on applying the input, the generating being over both the first neural network portion and the second neural network portion of the combined neural network model; and
updating one or more values of the second neural network portion based on a gradient determined based on the predicted output and the given training example output;
applying a regular image as input to the first portion input layer of the combined neural network model; and
generating an output based on applying the input, the generating being over both the first neural network portion and the second neural network portion of the combined neural network model.

2. The method of claim 1, further comprising:
assigning, to the regular image in one or more computer readable media, content that is based on the generated output.

3. The method of claim 1, wherein the joining occurs subsequent to training the first neural network portion based on the first group of training examples and subsequent to training the second neural network portion based on the second group of training examples.

4. The method of claim 1, wherein the joining occurs prior to training the first neural network portion based on the first group of training examples and prior to training the second neural network portion based on the second group of training examples.

5. The method of claim 1, wherein the regular image training example inputs of the first group of training examples each consist of a plurality of visible spectrum channels of a corresponding regular image.

6. The method of claim 1, wherein training the first neural network portion based on the first group of training examples comprises:
applying, as an input to an input layer of the first neural network portion, the regular image training example input of one of the training examples of the first group;
generating, over the first neural network portion and based on the input, predicted spectral image output;
determining a gradient based on comparison of the predicted spectral image output and the spectral image training example output of the one of the training examples of the first group; and
updating the first neural network portion based on the gradient.

7. The method of claim 1, wherein training the second neural network portion based on the second group of training examples comprises:
applying, as an input to the input layer of the second neural network portion, the spectral image training example input of one of the training examples of the second group;
generating, over the second neural network portion and based on the input, a predicted output;
determining a second gradient based on a comparison of the predicted output and the training example output of the one of the training examples of the second group; and
updating the second neural network portion based on the second gradient.

8. The method of claim 1, wherein the features indicate a plurality of classes and wherein the values for each of the training example outputs each indicate whether a corresponding one of the classes is present in a corresponding spectral training example input.

9. A method implemented by one or more processors, comprising:
applying, as input to a first portion of a neural network model:
a regular image training example input that is based on a regular image;
generating, over the first portion based on applying the input, a predicted spectral image, wherein the predicted spectral image includes one or more non-visible channels that are not included in the regular image training example input;
updating the first portion based on comparison of the predicted spectral image to a spectral image training example output, the spectral image training example output being based on a spectral image that corresponds to the regular image;
applying, as input to a second portion of the neural network model, spectral image training example input that is a spectral image;

generating, over the second portion based on applying the input, a predicted output;

updating the second portion based on comparison of the predicted output to a training example output that corresponds to the spectral training example input;

wherein updating the second portion based on the comparison occurs without updating of the first portion based on the comparison applying, as further input to the first portion, a further training example input that is based on a further regular image;

generating a further predicted output based on applying the further input, the generating being over both the first portion and the second portion; and further updating the second portion based on comparison of the further predicted output to a further training example output that corresponds to the further training example input;

wherein further updating the second portion occurs without updating of the first portion.

10. The method of claim 9, further comprising:

subsequent to updating the first portion and updating the second portion:

applying a regular image as further input to the first portion; and generating an output based on applying the further input, the generating being over both the first portion and the second portion.

11. The method of claim 9, wherein the further predicted output indicates a prediction of an object and/or a material that is present in the further regular image, and wherein the further training example output indicates a ground truth object and/or ground truth material that is present in the further regular image.

* * * * *